(12) United States Patent
Choi

(10) Patent No.: US 6,169,841 B1
(45) Date of Patent: Jan. 2, 2001

(54) DATA BANK APPARATUS AND METHOD OF A VIDEO RECORDING AND REPRODUCING SYSTEM

(75) Inventor: Seung-Lyeol Choi, Suwon (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 08/825,933

(22) Filed: Apr. 1, 1997

Related U.S. Application Data

(62) Division of application No. 07/791,226, filed on Nov. 13, 1991, now Pat. No. 5,636,313.

(30) Foreign Application Priority Data

Nov. 20, 1990 (KR) .................................................. 90-18773

(51) Int. Cl.$^7$ ................................................. H04N 5/91
(52) U.S. Cl. .............................. 386/46; 386/52; 386/64; 386/95
(58) Field of Search ................................. 386/46, 52, 64, 386/95; 360/13, 31; 369/32, 83, 50; H04N 5/76, 5/92, 5/79

(56) References Cited

U.S. PATENT DOCUMENTS

| 4,789,961 | 12/1988 | Tindall . |
| 5,267,351 | * 11/1993 | Reber et al. ........................... 360/13 |

FOREIGN PATENT DOCUMENTS 3415727  10/1985  (DE) .

* cited by examiner

*Primary Examiner*—Thai Tran
(74) *Attorney, Agent, or Firm*—Robert E. Bushnell, Esq.

(57) ABSTRACT

A data bank apparatus and method for use in a video recording and reproducing system are disclosed. The apparatus includes scanning devices for scanning two recording media install to and drive a video recording medium and an additional data recording medium, and two servos for driving the two recording media. Accordingly, user-assigned information can be recorded on a proper position of the data recording medium by the data scanning devices and the data servos, or can be retrieved from the data recording medium to be displayed on a display unit.

15 Claims, 3 Drawing Sheets

DATA BANK APPARATUS AND METHOD OF A VIDEO RECORDING AND REPRODUCING SYSTEM

CLAIM OF PRIORITY

This application is a divisional application of U.S. patent application Ser. No. 07/791,226, now U.S. Pat. No. 5,636, 313 filed Nov. 13, 1991 and makes reference to, incorporates the same herein, and claims all benefits accruing under 35 U.S.C §119 from an application entitled Data Bank Apparatus And Method Of A Video Recording And Reproducing System earlier filed in the Korean Industrial Property Office on Nov. 20, 1990, and there duly assigned Serial No. 90-18773 by that Office.

BACKGROUND OF THE INVENTION

1. Field of the Invention

The present invention relates to a data bank apparatus and method for storing and reading out information needed by a user, in a video recording and reproducing system for recording video information on a recording medium and reproducing the recorded video information.

2. Background Art

General video recording and reproducing systems, include video cassette recorders and camcorders. These video recording and reproducing systems have a basic function of recording video information on a recording medium and reproducing the recorded video information, plus additional functions which increase convenience, for instance, a parental locking function, an automatic rewinding function, a programmable recording function, etc.

With the advance of civilization, a modern person writes and manages information in note books including birthdays of family members, phone numbers of relatives and acquaintances, schedules, housekeeping duties, and check lists for the management of raising children, etc. by recording notes in a notebook. A problem exist, however, in that the notes can be easily lost, since the notes are separately provided according to the frequency in use of the books.

SUMMARY OF THE INVENTION

Accordingly, it is an object of the present invention to provide a data bank apparatus and the performing method thereof which can be added to a video recording and reproducing apparatus for storage and retrieval of information by a user.

To achieve the object of the present invention, a data bank apparatus is used in a video recording and reproducing system having a system controller for controlling and processing the system, a head drum including a first scanning device for recording information on a recording medium and reading out and reproducing the information, a first servo for driving the head drum and the recording medium under the control of the system controller, a video processor for processing the video signal to be recorded in the first scanning device to supply the processed video information, or for processing the video information read out by the first scanning device to generate a reproduced video signal, and a key input for transferring user-assigned instructions and information to the system controller, the data bank apparatus comprising: a second scanning device added onto the head drum for recording or reading out the information on or from a second recording medium; second servo means for driving the second scanning means added onto the head drum; a data processor for processing the digital data received from the system controller to be recorded on the second recording medium to supply it to the second scanning device, or processing the information read out by the second scanning device to supply the reproduced digital data to the system controller; a signal converting device for converting the display data processed in the system controller into a video signal form; and a mixer for mixing the display video signal generated in the video processor with the information signal generated in the signal converting device. To achieve the object of the present invention, a method performed in a data bank apparatus comprises the steps of: setting a data base mode when a data base is required and receiving user-assigned information until a record or reproduction request exists; recording the received information by finding out an information recording position when a record request exists in the information receiving step; and reproducing the information by finding out the data information on the received information when a reproduction request exists in the information receiving step.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
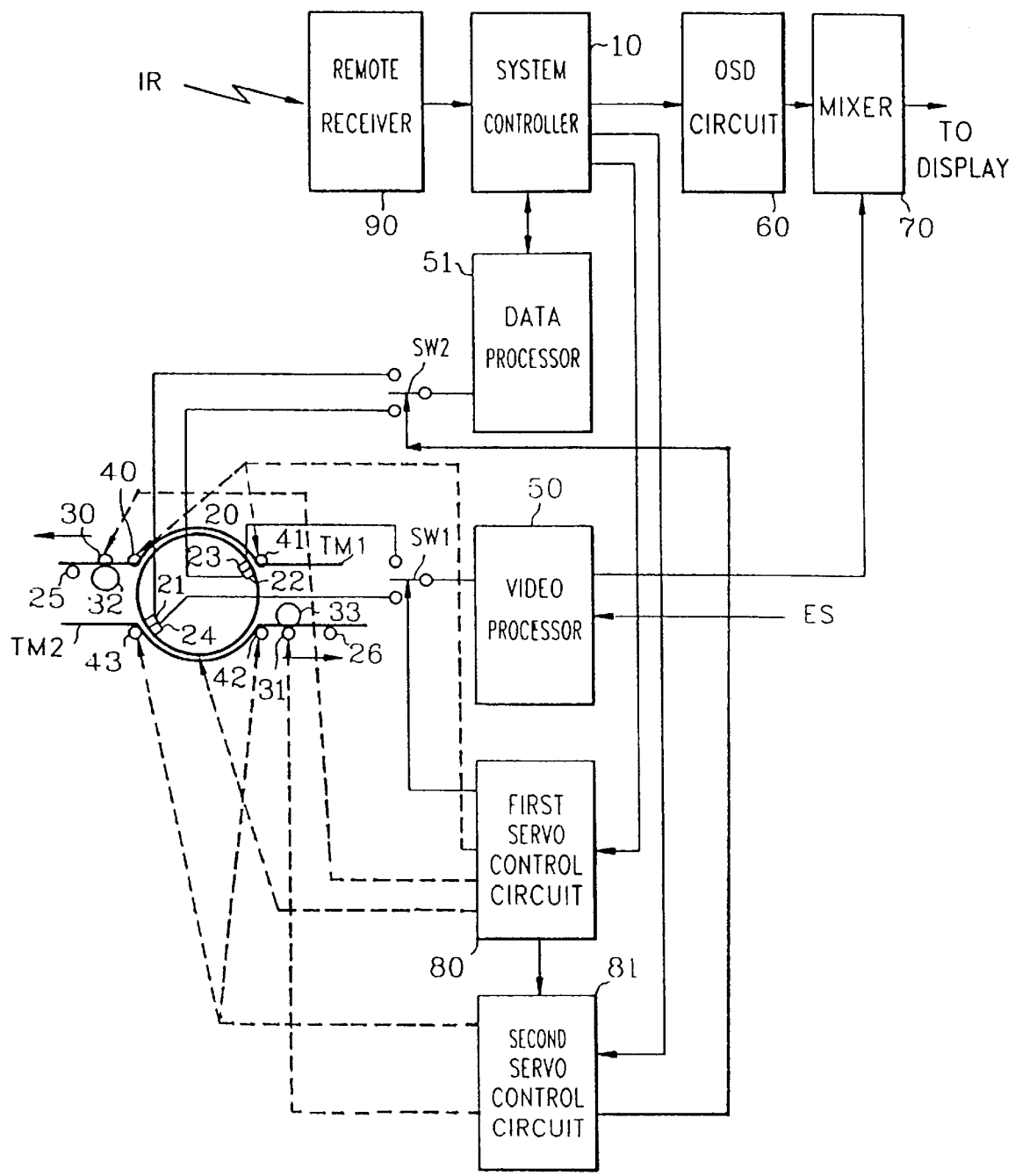
FIG. 1 is a block diagram of an embodiment of a data bank apparatus according to the present invention for use in a video recording and reproducing system.

Hereinafter, an embodiment of the present invention will be described with reference to the accompanying drawings. In FIG. 1, first and second video heads 21 and 22 are mounted on a circumference 180° apart from each other, and first and second data heads 23 and 24 are provided beside first and second video heads 21 and 22 which are also 180' apart from each other.

First and second capstans 30 and 31 are installed to the side of the circumference surface of head drum 20 and to be at symmetric positions with respect to head drum 20, thereby constituting respective pairing with first and second pinch rollers 32 and 33. First and second slanted posts 40 and 41 are movably installed near the circumference surface of head drum 20, so that they may move in order for first record medium TM1 to make contact around or be slightly separated from a circumference surface less than half the head drum's circumference surface. Third and fourth slanted posts 42 and 43 are likewise installed in symmetric opposition to the circumference surface of head drum 20 around which first recording medium TM1 makes contact, so that they may move in order for second record medium TM2 to make contact around or be slightly separated from the circumference surface.

First and second control heads 25 and 26 are respectively installed to make contact with first and second record media TM1 and TM2 which are disposed apart from the head drum 20 and also are respectively connected to the first and second servo control circuits 80 and 81. The first and second servo control circuits 80 and 81 are each connected to a system controller 10. Two selection contacts of a first control switch SW1 are connected to first and second video heads 21 and 22, respectively, while a reference contact of is SW1 connected to a video processor 50 and its control terminal is connected to first servo control circuit 80. Correspondingly, two selection contacts of a second control switch SW2 are also connected to first and second data heads 23 and 24, but a reference contact of SW2 is connected to a data processor 51 and a control terminal of SW2 is connected to second servo control circuit 81. The video processor 50 is connected between the reference contact of first control switch SW1 and a mixer 70. The data processor 51 is connected between the reference contact of second control switch SW2 and system controller 10. The on screen display circuit 60 receives an input from system controller 10 and an output is connected to mixer 70 which provides an output to a display unit (not shown). A remote receiver 90 provides its output for system controller 10.

In the operation of the apparatus shown in FIG. 1, remote receiver 90 receives an infrared (IR) signal sent from a remote transmitter, and supplies key data for a function and information assigned by a user to system controller 10.

During recording, video processor 50 processes the video signal received through an external signal source ES to be recorded on a recording medium, and supplies the processed video signal to first and second video heads' 21 and 22 through first control switch SW1. During reproducing, video processor 50 processes the video information received from first and second video heads 21 and 22 through first control switch SWI and supplies the reproduced video signal to mixer 70.

Also during recording, data processor 51 converts the data received from system controller 10 into an analog signal to be recorded on the recording medium, and supplies the converted analog signal to first and second data heads 23 and 24 through second control switch SW2, and during reproducing, data processor 51 demodulates the analog signal received from first and second data heads 23 and 24 through second control switch SW2, and supplies the reproduced digital data to system controller 10. Here, the modulating/demodulating methods may be amplitude-shift keying, frequency-shift keying, phase-shift keying, quadrature amplitude modulation and demodulation, etc.

The on screen display circuit 60 converts the character data supplied from system controller 10 into a video signal and supplies the converted video signal to mixer 70. Mixer 70 mixes the video signal supplied from the on screen display circuit 60 with the video signal received from the video processor 50 and supplies the mixed signal to a display unit or an external video recording and reproducing system.

The first control switch SW1 selectively connects the video heads 21 and 22 for scanning first recording medium TM1, to video processor 50 by connecting a reference contact to one of two selection contacts according to a logic state of a first switching pulse supplied from first servo circuit 80. Similarly, second control switch SW2 selectively connects the data heads 23 and 24 for scanning second recording medium TM2, to data processor 51 by connecting a reference contact to one of two selection contacts according to a logic state of a second switching pulse supplied from second servo circuit 81.

Under the control of system controller 10, the first servo circuit 80 moves first and second slanted posts 40 and 41 up and down to contact or separate the first record medium TM1 with the circumference surface of head drum 20, while properly controlling rotating speeds of head drum 20 and first capstan 30 so that first and second video heads 21 and 22, disposed on the circumference surface of head drum 20, will alternatively scan slanted tracks of the first recording medium TM1 during recording and reproducing. During recording, first servo circuit 80 records control information for a running speed of the first record medium TM1 onto a control track through first control head 25. During reproducing, first servo circuit 80 receives the control information read out from first recording medium TM1 and properly controls the speeds of first capstan 30 and head drum 20.

Also under control of system controller 10, second servo circuit 81 moves third and fourth slanted posts 42 and 43 up and down to contact or separate the second recording medium TM2 with the circumference surface of head drum 20, while properly controlling the rotating speeds of head drum 20 and second capstan 31 so that first and second data heads 23 and 24 attached on the circumference surface of head drum 20, will alternatively scan slanted tracks of the second recording medium TM2 during reproducing and recording. Second servo circuit 81 controls the rotating speeds of second capstan 31 and head drum 20 when a drum driving signal which indicates driving of first recording medium TM1, has been received from first servo circuit 80. Also, during recording, second servo circuit 81 records the control information for the running speed of second recording medium TM2 onto a control track through second control head 26. During reproducing, second servo circuit 81 receives the control information read out from the control track of second recording medium TM2, and properly maintains a relationship between the rotating speeds of second capstan 31 and head drum 20.

The system controller 10 receives the user's commands via remote receiver 90 and, according to instructions, controls first and second servo circuits 80 and 81 and the peripheral circuitry. Also, system controller 10 receives the user's input information through remote receiver 90 to record it on second recording medium TM2 through data processor 51 and first and second data heads 23 and 24, or sends the information reproduced by first and second data heads 23 and 24 and data processor 51 through on screen display circuit 60 and mixer 70 to be displayed on an external display unit.

Figure 2A:
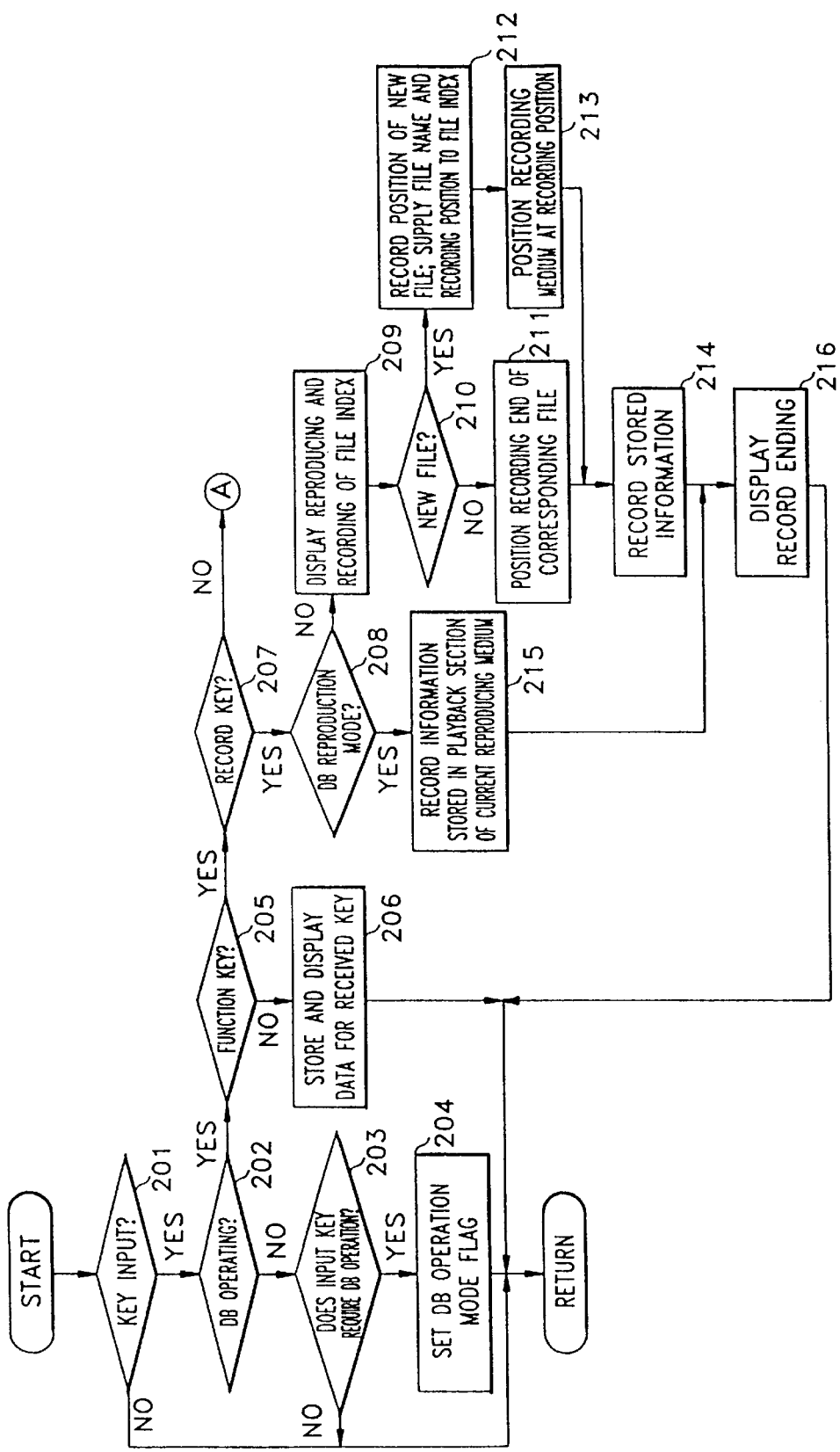
FIGS. 2A and 2B are flowcharts of the method according to the present invention.
Figure 2B:
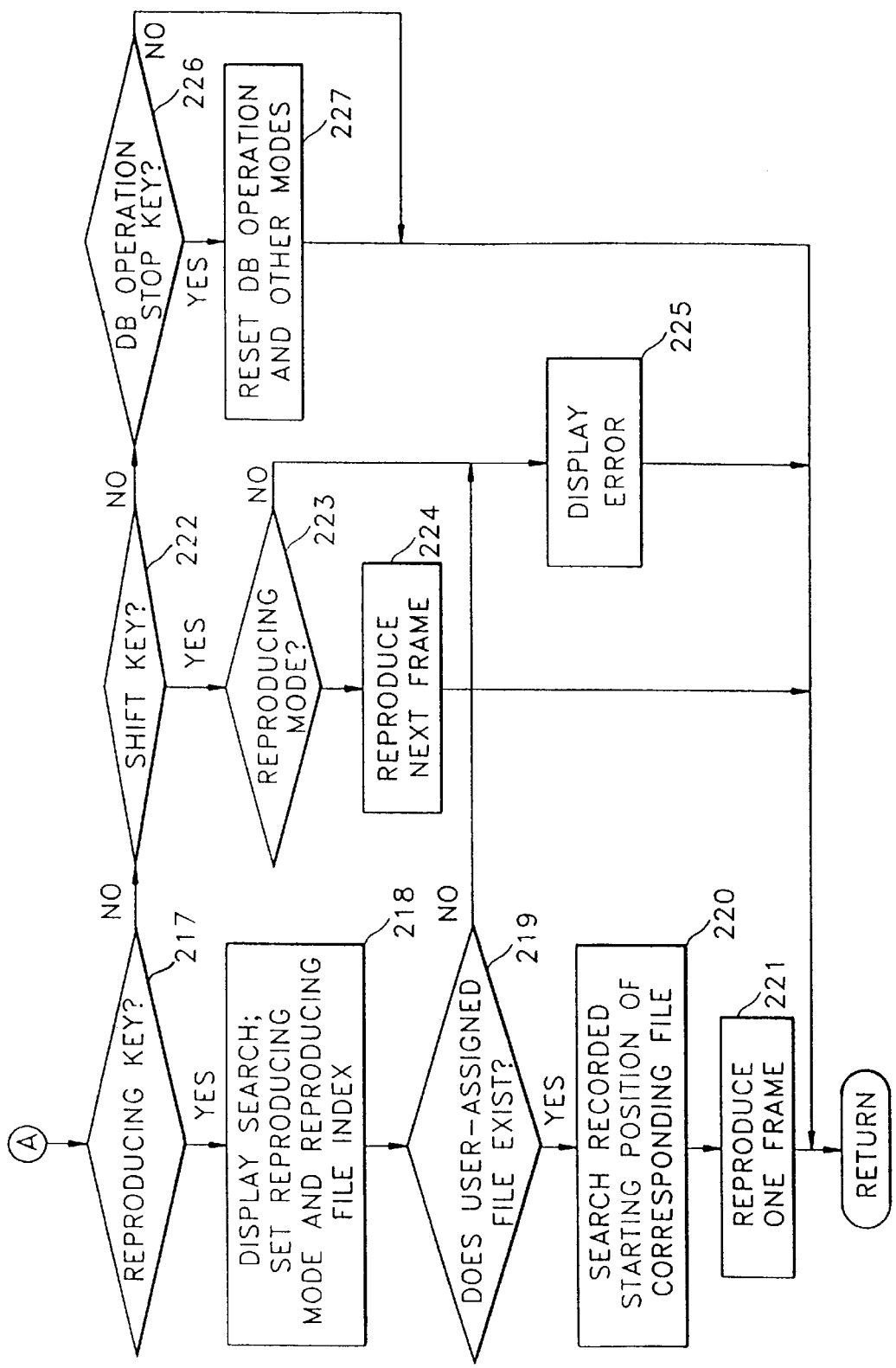

In FIG. 1, first and second video heads 21 and 22 and first control switch SW1 correspond to a first scanning device, while first and second data heads 23 and 24 and second control switch SW2 correspond to a second scanning device. Further, first and second slanted posts 40 and 41, first control head 25, pinch roller 32, first capstan 30, and first servo circuit 80 correspond to a first servo device, while third and fourth slanted posts 42 and 43, second control head 26, second capstan 31, pinch roller 33, and second servo circuit 81 correspond to a second servo device. FIGS. 2A and 2B are flowcharts of a method of the present invention performed by system controller 10 of the circuit shown in FIG. 1.

In FIGS. 2A and 2B, steps 201 through 206 correspond to an information receiving process, steps 207 through 216 correspond to an information recording process, and steps 217 through 227 correspond to an information reproducing process. The flowcharts shown in FIGS. 2A and 2B will be described in connection with the circuit shown in FIG. 1. While running a main program, system controller 10 periodically reads the output of an internal key data input buffer and checks whether or not the key data corresponding to the instruction or information for controlling the user's assigned functions is received from remote receiver 90 in step 201. When key data is present in step 201, system controller 10 checks whether a data bank operation mode flag assigned in an internal register is set, and determines whether a data bank is operating in step 202.

When the data bank operation mode flag is not set in step 202, system controller 10 checks the logic value of the received key data to determine whether it requires the data bank to be operating in step 203.

When the received key data is a logic value for a key requiring data bank operation in step 203, then system controller 10 sets the data bank operation mode flag assigned in a register to set the mode to data bank operation mode, and reads out the input information message from an internal program memory and display the message on the external display unit through on screen display circuit 60 and mixer 70 in step 204.

If the data bank operation mode flag was set in step 202, system controller 10 checks a logic value of the received key data to determine whether it is for a function key in step 205.

When a logic value of the received key data does not correspond to a function key in step 205, system controller 10 determines an information key has been received, stores the data for the received information key in an internal working memory, and displays the data corresponding to the information key on a display unit through on screen display circuit 60 and mixer 70 in step 206.

When the logic value of the received key data is for a function key in step 205, system controller 10 checks whether the logic value of the received key data corresponds to a record key in step 207.

When the logic value of the received key data is for a record key in step 207, system controller 10 checks whether the data bank reproduction mode flag assigned in the internal register is set to determine whether the data bank is currently being reproduced in step 208.

If the system is not in the data bank reproduction mode in step 208, system controller 10 reads out the recording display message from the internal program memory, and displays it on the external display unit through on screen display circuit 60 and mixer 70. Also, system controller 10 controls second servo circuit 81 to load second recording medium TM2 so that a first portion among intervals recorded with a file index on second recording medium TM2 is scanned by data heads 23 and 24, then, the system controller 10 rewinds the tape. While system controller 10 controls second servo circuit 81 to again reproduce second recording medium TM2, the system controller 81 receives the file index reproduced through data heads 23 and 24, second control switch SW2, and data processor 51 in the step 209. When the file index of second record medium TM2 is reproduced, second servo circuit 81 senses a rotating speed of head drum 20 to control a rotating speed of second capstan 31 according to the sensed rotating speed of head drum 20. Second servo circuit 81 controls a switching speed of second control switch SW2 in order to connect the data head 23 and 24 which is in contact with second record medium TM2, to data processor 51. Further, second servo circuit 81 moves third and fourth slanted posts 42 and 43 upward to connect or load second recording medium TM2 to a circumference surface of head drum 20.

After carrying out step 209, system controller 10 checks whether a file name has been assigned in the file index for the information to be recorded and stored in the internal working memory exists in the file index in step 210.

When the assigned file name does exist in the file index in step 210, system controller 10 controls second servo circuit 81, making it run second recording medium TM2 at a high speed until a record position value read out from second recording medium TM2 by second control head 26 and received through second servo circuit 81, equals that of the first portion of the file recorded with the file name in the file index in step 21 1. After reaching the starting position of the portion where the corresponding file is recorded, system controller 10 performs a high speed search until reception of the data reproduced from data heads 23 and 24 through second control switch SW2 and data processor 51 is interrupted, and controls the second servo circuit 81 to stop the second record medium TM2 when the reproduced data is complete in step 211.

When the file name for recording the information stored in the working memory does not exist in the file index in step 210, system controller 10 sets the starting position for recording the information stored in the working memory as recording position information which is larger by a predetermined value than the recording position information corresponding to an end portion recorded with a last file, and supplies the recording position information set for a new file together with the new file name stored in the working memory, to data heads 23 and 24 through data processor 51 and second control switch SW2. Also at the same time, system controller 10 controls second servo circuit 81 to drive head drum 20, second capstan 31 and second control switch SW2, so that second recording medium TM2 is scanned in a normal reproduction mode by data heads 23 and 24 in step 212.

After performing step 212, system controller 10 controls second servo circuit 81 to run second recording medium TM2 at a high speed until the recording position information for the set recording position value for recording new information is received from second control head 26 through second servo circuit 81, and then to stop the second recording medium TM2 in step 213. After performing step 211 or 213, system controller 10 controls second servo circuit 81 to drive second capstan 31, head drum 20 and second control switch SW2, so that second recording medium TM2 is scanned in a normal record mode by data heads 23 and 24, and sequentially supplies the information to be recorded and being stored in the working memory to data heads 23 and 24 through data processor 51 and second control switch SW2 and records the information on second recording medium TM2 in step 214.

If the system is in the data bank reproduction mode in step 208, system controller 10 supplies the information stored in the working memory to data heads 23 and 24 through data processor 51 and second control switch SW2 and records the corrected information onto the reproducing position of second recording medium TM2 which is currently being reproduced in step 215.

After performing step 214 or 215, system controller 10 controls second servo circuit 81 to stop head drum 20, second capstan 31, and second control switch SW2, thereby stopping second recording medium TM2, and moving third and fourth slanted posts 42 and 43 downward. Then, system controller 10 reads out the internally-stored record completion display message and displays it on the external display unit through on screen display circuit 60 and mixer 70 in step 216.

When the logic value of the received key data is different from that of the record key in step 207, system controller 10 sets the reproduction mode flag assigned in its register to set the mode to a data bank reproduction mode, reads out the searching display message stored in the internal program memory to display it on the external display unit through on screen display circuit 60 and mixer 70. Further, system controller 10 controls second servo circuit 81 to make the second recording medium TM2 contact the circumference surface of head drum 20, so that the scanning is sequentially performed by data heads 23 and 24 from the first portion among the portions where the file index in second recording medium TM2 is recorded, and then drives head drum 20, second capstan 31 and second control switch SW2, so that second recording medium TM2 is reproduced. At this time, system controller 10 receives the file index reproduced from data heads 23 and 24 through second control switch SW2 and data processor 51 in step 218.

After performing step 218, system controller 10 checks whether the user-assigned file name stored in the internal working memory exists in the reproduced file index in step 219.

When the user-assigned file name exists in the reproduced file index in step 219, system controller 10 controls second servo circuit 81 to run second recording medium TM2 at a high speed until the recording position value read out from second recording medium TM2 by second control head 31 and received through second servo circuit 81, equals the recording position value of the record starting position of the file to be reproduced and being recorded together with the file name in the file index, and controls second servo circuit 81 to stop second recording medium TM2 for supplying reproduced record starting position value equal to the record starting position value of the file to be reproduced in step 220.

After performing step 220, system controller 10 controls second servo circuit 81 to drive head drum 20, second capstan 31 and second control switch SW2 so that second recording medium TM2 runs in a normal mode until the data corresponding to one picture screen is reproduced. System controller 10 stores the reproduced information received through second control switch SW2 and data processor 51 from data heads 23 and 24 in its internal working memory and, for every frame, displays the stored reproduced information on the external display unit through on screen display circuit 60 and mixer 70 in step 221.

If the logic value of the received key data is different from that of the reproduction key in step 217, system controller 10 checks whether the value equals that of the shift key for reproducing a next frame, in step 222.

When the logic value of the received key data equals that of the shift key in step 222, system controller 10 checks whether the data bank reproduction mode flag assigned in a register is set in step 223.

When the data bank reproduction mode flag is set in step 223, system controller 10 reproduces the information corresponding to the next one picture screen and stores it in the internal working memory, and for every frame, supplies the information stored therein to the external display unit through on screen display circuit 60 and mixer 70 to be displayed in step 224.

When the user-assigned file name does not exist in the file index in step 219 or the DB reproduction mode flag is not set in step 223, system controller 10 reads out the error display message stored in the internal program memory and displays it on the external display unit through on screen display circuit 60 and mixer 70 in step 225.

When the logic value of the received key data does not equal that of the shift key in step 222, system controller 10 checks whether the logic value corresponds to the data bank operation stop key in step 226.

When the logic value of the received key data equals that of the DB operation stop key in step 226, system controller 10 resets the data bank operation mode flag assigned in the internal register to release the data bank operation mode, and initializes the data bank operation mode flag and other information for data bank operation in step 227.

As described above, the data bank apparatus according to the present invention has advantages in that the second recording medium for data bank is provided with a recording medium driving means, so that the first and second recording media are driven by the recording medium driving means, and when the data bank is required, the information recorded on the second recording medium is reproduced and displayed together with video information according to a predetermined program, thereby enabling the second recording medium to have a data bank function.

What is claimed is:

1. A data bank apparatus of a video recording and reproducing system, said system comprising:

system controller means for controlling the system;

a head drum comprising first scanning means for recording received video information on a first recording medium, and for reading and reproducing recorded video information from the first recording medium;

first servo means for driving the head drum and the first recording medium under the control of the system controller means;

video processor means for processing video signals to be recorded by the first scanning means as said received video information, and for processing said recorded video information read by the first scanning means to generate reproduced video signals; and key input means for transferring commands and information designated by a user to the system controller means;

and said data bank apparatus comprising:

second scanning means added onto said head drum for recording received data information on a second recording medium, and for reading recorded data information from the second recording medium;

second servo means for driving said second scanning means in response to the system controller means;

data processor for providing to said second scanning means the received data information by processing digital data received from said system controller to be recorded onto said second recording medium, and for supplying to said system controller means reproduced data based upon the recorded data information read by said second scanning means;

signal converting means for converting display data processed in said system controller into an information video signal; and mixing means for mixing the reproduced video signals generated in said video processor means with the information video signal generated in said signal converting means.

2. A data bank apparatus as claimed in claim 1, further comprised of said system controller means:

enabling a data bank mode in response to user selection of a data bank capability;

storing user entered data into an internal working memory and displaying said user entered data;

reading indexing data of said reproduced data from a file index portion of said second recording medium;

determining whether an assigned file name designated by said user constitutes a new file name in response to said indexing data;

advancing said second recording medium until a recorded file is detected which corresponds to said assigned file name, and amending said recorded file which corresponds to said assigned file name in response to said user entered data, if said assigned file name does not constitute said new file name;

advancing said second recording medium to an unrecorded portion, creating a new file corresponding to said assigned file name, and amending said new file in response to said user entered data, if said assigned file name constitutes said new file name;

enabling a reproduction function of said data bank mode in response to user selection of a reproducing key;

reading and displaying said indexing data from said file index portion of said second recording medium;

determining whether a user designated file name exists in response to said indexing data; and advancing said second recording medium until a recorded file is detected which corresponds to said user designated file name, and reading and displaying contents of said recorded file corresponding said user designated file name if said assigned file name is determined to exist.

3. A method of operation for a video tape recorder having a data bank capability, said method comprising:

receiving input video signals from an external source and recording said input video signals on a video recording media via a first video head and a second video head of a rotating head drum in response to user enablement of a video recording mode;

detecting recorded video signals recorded on said video recording media via said first video head and said second video head, and providing said recorded video signals to a video processor in response to user enablement of a video reproducing mode, said video processor processing said recorded video signals for display on a display device;

providing user entered database data from a system controller of said video tape recorder to a data processor, modulating said database data in said data processor to generate input data signals, and recording said input data signals on a data recording media via a first data head and a second data head of said rotating head drum in response to user enablement of a data recording mode; and detecting recorded data signals recorded on said data recording media via said first data head and said second data head, providing said data signals to said data processor for demodulation to generate display data, and providing said display data to an on-screen display circuit controlling a display device.

4. A method as claimed in claim 3, wherein said video recording media and said data recording media each comprise video tape of separate video tape cassettes.

5. A method as claimed in claim 3, wherein recording said input video signals on said video recording media comprises:

actuating video slant posts to load said video recording media onto said rotating head drum; and transporting said video recording media across said rotating head drum.

6. A method as claimed in claim 3, wherein recording said input data signals on said data recording media comprises:

actuating data slant posts to load said data recording media onto said rotating head drum; and transporting said data recording media across said rotating head drum.

7. A method as claimed in claim 5, wherein recording said input data signals on said data recording media comprises:

actuating data slant posts to load said data recording media onto said rotating head drum; and transporting said data recording media across said rotating head drum.

8. A method as claimed in claim 3, wherein said video recording media is loaded on said rotating head drum on a first side of an axis of rotation of said rotating head drum and said data recording media is loaded on said rotating head drum on a second side of said axis, said first side opposing said second side.

9. A method for utilizing a data bank in a video recording and reproducing machine having a video recording tape and a separate data recording tape said method comprising the steps of:

recording onto or reproducing video signals from said video recording tape in a video mode;

setting a data bank mode in response to user selection of a data bank function and receiving user designated information until user selection of one of a record request and a reproduction request is detected;

recording said user designated information on said data recording tape by determining an information recording position when said record request is detected while receiving said user designated information; and reproducing recorded information from said data recording tape when a reproduction request is detected while receiving said user designated information.

10. A method of operation for a video tape recorder capable of data storage and video signal reproduction and recordation, said method comprising:

providing user entered database data from a system controller of said video tape recorder to a data processor, modulating said database data in said data processor to generate input data signals, and recording said input data signals on a data recording media via a first data head and a second data head of a rotating head drum, in response to user enablement of a data recording mode; and detecting recorded data signals recorded on said data recording media via said first data head and said second data head, providing said data signals to said data processor for demodulation to generate display data, and providing said display data to an on-screen display circuit controlling a display device, in response to user enablement of a data reproducing mode.

11. A method of as claimed in claim 10, further comprising:

receiving input video signals from an external source and recording said input video signals on a video recording media via a first video head and a second video head of said rotating head drum, in response to user enablement of a video recording mode; and detecting recorded video signals recorded on said video recording media via said first video head and said second video head, and providing said recorded video signals to a video processor in response to user enablement of a video reproducing mode, said video processor processing said recorded video signals for display on a display device.

12. A method as claimed in claim 11, wherein said video recording media and said data recording media each comprise video tape of separate video tape cassettes.

13. A method as claimed in claim 11, wherein recording said input video signals on said video recording media comprises:
   actuating video slant posts to load said video recording media onto said rotating head drum; and
   transporting said video recording media across said rotating head drum.

14. A method as claimed in claim 11, wherein recording said input data signals on said data recording media comprises:
   actuating data slant posts to load said data recording media onto said rotating head drum; and
   transporting said data recording media across said rotating head drum.

15. A method as claimed in claim 14, wherein recording said input data signals on said data recording media comprises:
   actuating data slant posts to load said data recording media onto said rotating head drum; and
   transporting said data recording media across said rotating head drum.

* * * * *